Figure 1:
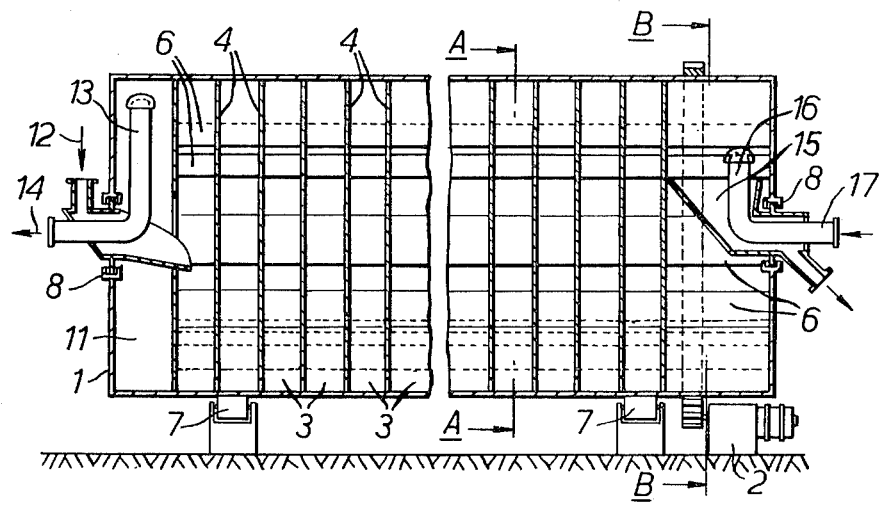

United States Patent [19]

Hohlbaum

[11] 4,244,656
[45] Jan. 13, 1981

[54] APPARATUS FOR CONTACTING LIQUIDS AND SOLIDS WITH LIQUIDS

[75] Inventor: Theodor J. M. Hohlbaum, Ilford, England

[73] Assignee: RTL Contactor Holding S.A., Switzerland

[21] Appl. No.: 964,507

[22] Filed: Nov. 29, 1978

[51] Int. Cl.³ .............................................. B01F 9/06
[52] U.S. Cl. .................................. 366/180; 366/187; 366/228; 366/235
[58] Field of Search ............. 366/235, 228, 225, 226, 366/54, 91, 93, 220, 213, 25, 135, 180, 187; 422/272, 269, 270

[56] References Cited

U.S. PATENT DOCUMENTS

| | | | |
|---|---|---|---|
| 1,520,752 | 12/1924 | Horwitz | 209/173 X |
| 2,337,137 | 12/1943 | Thompson et al. | 422/272 |
| 3,216,345 | 11/1965 | Rigby et al. | 366/225 |
| 3,649,209 | 3/1972 | Coleby | 422/269 |
| 3,666,240 | 5/1972 | Lodige et al. | 366/235 |
| 3,730,689 | 5/1973 | Odom et al. | 422/272 |
| 3,910,756 | 10/1975 | Henning | 366/228 |
| 3,940,118 | 2/1976 | Heinemann et al. | 366/228 |

*Primary Examiner*—Philip R. Coe
*Attorney, Agent, or Firm*—Bernard & Brown

[57] ABSTRACT

A continuous liquid/liquid or liquid/solids contactor consists of a rotary contactor having a near horizontal axis. The interior of the drum is divided axially into a number of compartments by spaced discs secured to the drum wall and having openings through which the materials to be contacted can pass from one end to the other of the drum. In each compartment, there are a number of buckets which are carried by the discs and which in operation serve to cause intermingling of the materials to be contacted. At the ends of the drum are inlet and outlet passing through rotary joints in the drum ends and carrying the streams to be brought into contact.

9 Claims, 6 Drawing Figures

APPARATUS FOR CONTACTING LIQUIDS AND SOLIDS WITH LIQUIDS

This invention relates to apparatus for contacting liquids or a liquid with solids or a slurry; that apparatus will hereinafter be referred to as "a contactor" for convenience.

There has previously been described a contactor comprising a stationary drum within which is mounted a rotor in the form of a shaft carrying a series of axially spaced discs which divide the drum interior into a series of compartments. The periphery of each disc is spaced from the drum to form an annular passage through which consecutive compartments communicate. Trough-like receptacles are carried by the discs in each compartment. The liquids or the liquid and the slurry pass through the drum in counter-current and in two phases, passing from compartment to compartment via the annular peripheral passages; as the rotor turns slowly, the receptacles rotate and cause non-turbulent gentle mixing of the phases.

The number of compartments and hence the length of the drum are dependent on the contact time and the throughputs that are required. When the number of compartments is large, it is difficult to achieve proper rigidity for the rotor, the shaft of which is mounted in bearings in the end plates of the drum; the rotor is liable to sag with the consequence that the rotor is subject to metal fatigue through constant flexing during rotation. Additionally, some of the peripheral passages may be reduced in width at the lower part of the drum creating distortion in the flow of the two streams through the contactor.

To avoid the above-mentioned problem, the present invention provides a contactor for continuous contacting at least two streams passing therethrough in substantially separate phases, the contactor comprising a drum mounted for rotation about its axis and having means for causing rotation; a plurality of axially spaced discs secured within the drum and dividing the drum interior into a series of compartments, which communicate with one another through openings in the discs and/or between the discs and the drum; a plurality of receptacles within each of at least some of the compartments and arranged to rotate with the drum and to cause intermingling of the phases; and means for introducing the streams into the drum and discharging the streams from the drum. As the discs are individually secured to the drum, no distortion of the discs can occur; more importantly, the drum can be so rotatably supported that flexing during rotation is minimised.

The discs and/or the receptacles can be made less rigid and may be made of suitable plastics materials, for example, because they are no longer under stress.

Figure 2:
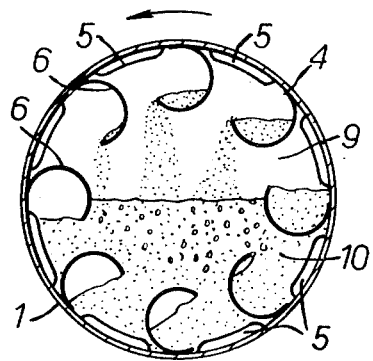
Figure 3:
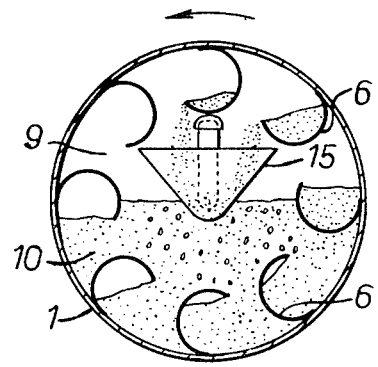
Figure 4:
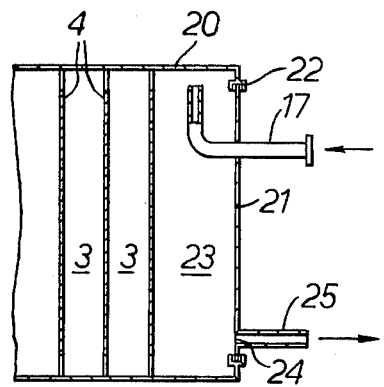
Figure 5:
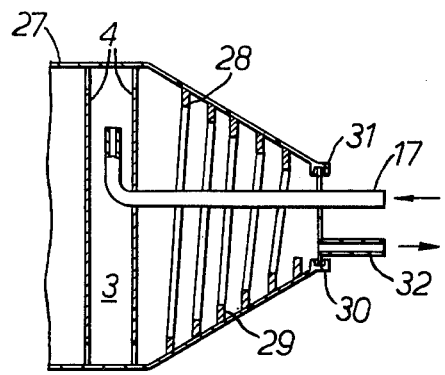
Figure 6:
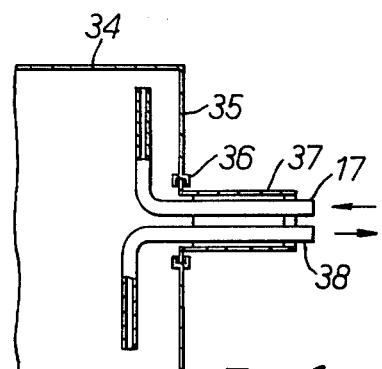

The invention will be more readily understood by way of example from the following description of contactors in accordance therewith, reference being made to the accompanying drawings, in which FIG. 1 is a vertical axial section through a contactor, FIGS. 2 and 3 are radial sections on the lines A—A and B—B respectively of FIG. 1, the support and drive mechanism being omitted, and FIGS. 4 to 6 are axial sections of one end of the contactor and illustrate modifications.

The contactor of FIGS. 1 to 3 comprises a cylindrical, substantially horizontal drum 1 which is rotated slowly by means of an external girth gear drive 2 whilst supported by two or more sets of riding rings and rollers 7.

The interior of drum 1 is divided into a series of separate compartments 3 by means of near-circular discs 4, which are secured to, and supported by, the interior wall of the drum 1. A series of holes or slots 5 are provided along the peripheral of the discs 4 so that the compartments 3 are communicating along the inside wall of the drum 1. A series of receptacles in the form of buckets 6 are arranged within each compartment 3, each receptacle open at its leading side in the direction of rotation. Typically the diameter of the receptacles 6 could be about 1/6 of the diameter of the drum 1. There may be any convenient number of receptacles 6 between two adjacent discs 4 the receptacles being spaced around the discs 4 near the periphery. Any desired number of discs 4 and thus any number of compartments 3 may be used in accordance with the required number of theoretical stages of mass-transfer.

The buckets 6 are formed as part-cylindrical channels which extend over the entire axial length of the disc structure, being threaded through appropriate shaped slots in the individual disc 4, and are secured to the right hand end plate of the drum. As there is no relative movement between the buckets and the drum, the buckets 6 can extend to the wall of the drum as shown, unlike prior forms of rotary contactor employing a stationary drum and a rotor constituted by discs and buckets. In fact, the buckets 6 are secured to, and carried by, the drum 1 being merely track-welded to the discs.

For the introduction of liquids and the solids for treatment rotary pipe joints 8 are fitted to both end plates of the rotating vessel 1. The solids-carrying slurry—normally the heavier phase—and the treating liquid—normally the lighter phase—enter the vessel at opposite ends, fill the vessel completely—the lighter phase filling the top half 9 whilst the heavier phase occupying the bottom half 10 with the interface near the centre of the apparatus—and flow counter-current through the compartments 3 defined by the discs 4. The two streams pass from one compartment to the next via the openings 5 around the discs 4 and are repeatedly contacted in the compartments 3 by the action of the receptacles 6 which carry the heavier phase up into the lighter and the lighter phase down into the heavier causing the streams of each liquid to flow through the other liquid. To enhance the travel of the heavier phase along the length of the vessel it may be necessary to slope the vessel at 7°, for example, and to provide openings in the discs 4 additional to the peripheral slots 5; those additional openings may be aligned with and connect some of the receptacles 6 in adjacent compartments in the discs, the openings in consecutive discs being relatively staggered so that no receptacle has openings at both ends.

In the prior form of contactor having a stationary drum and exemplified by U.S. Pat. No. 3,649,209 the buckets were carried by the discs and could not extend to the drum wall. There was then a tendency for a layer of stationary solids to form at the bottom of the annular passage between the edges of the compartment discs and the drum wall and thereby to obstruct the flow of solids from compartment to compartment. By having a rotary drum, the buckets 6 in the present arrangement extend to the drum wall as described above, with the results that no stationary solids layer can form and that all solids are scooped up by the buckets and are brought into contact with the lighter stream.

Because the solids are held in suspension by the action of the buckets, they can move axially along the contactor through successive compartments. If necessary, the axial movement of the solids can be encouraged by having helical scrolls carried by the inner wall of the drum and passing through the slots 5.

A settling chamber 11 without receptacles 6 is provided at the slurry entry end of the drum and prevents inflowing heavy phase 12 escaping through a capped standpipe 13 serving as an outlet for the light phase 14. The heavy phase on the other end of the apparatus (FIG. 3) is scooped up by the receptacles and emptied into a hopper 15 to be discharged via the rotary pipe joint 8. The lighter phase enters via an inlet pipe 17 and a capped stand pipe 16 which prevents the heavy phase entering the inlet pipe 17.

In the slurry discharge means illustrated in FIGS. 1 and 3 (the hopper 15 fed by the receptacles 6), the lighter phase may be discharged with the slurry through the discharge pipe. To reduce that discharge, the hopper 10 may be made shallower so that it is below the interface between the two phases and/or the level of the interface may be raised above that shown in the drawings. For some materials, the hopper may be dispensed with entirely, the solids discharging through the exit pipe in suspension, and the interface may be above the level of the joint 8.

If significant entrainment occurs, the slurry discharge may be treated to recover the lighter phase. Thus, as described in U.S. Pat. No. 3,649,209, the slurry may be fed to an external settling tank to which the lighter phase is introduced, and from which the lighter phase is directed to the contactor.

FIGS. 4 to 6 illustrate alternative forms of that end of the contactor where the heavier phase is discharged.

In the alternative of FIG. 4, the drum consists of a rotary shell 20 with a stationary end plate 21 sealed to the shell by a rotary joint 22. The end compartment 23 of the drum does not have any of the receptacles 6 and thus constitutes a settling chamber; it has a slurry discharge opening 24 near the bottom of the end plate 21 connected to a discharge pipe 25. The lighter phase enters through the inlet pipe 17 which is above the level of the interface between the two phase. There is little intermingling of the phases in the end compartment 23 so that there is no entrainment of the lighter phase with the treated slurry discharged through pipe 25.

In FIG. 5, the drum consists of a cylindrical shell 27 which at the end at which the slurry is discharged is secured to a coaxial frusto-conical extension 28. The end of extension 28 is closed by a stationary end plate 30 sealed to the extension 28 by a rotary joint 31. The end plate 30 carries the inlet pipe 17 for the lighter phase and a discharge pipe 32 for the heavier phase; in this case, the inlet pipe 17 preferably extends into the first compartment 3, and is supported in bearings in the disc 4 closest to the joint 31 located respectively above and below the interface between the two phases within the contactor. There are preferably means for lifting the slurry at the bottom of the contactor to the discharge; those means are shown in FIG. 5 as consisting of a helical scroll 29 on the inner face of the extension 28, alternatively a screw conveyor within the extension 28 can extend from the bottom of the drum to the discharge pipe 32.

In FIG. 6, the drum is shown as a shell 34 having an integral end plate 35 sealed by a rotary joint 36 to a stationary tube 37. Secured within tube 37 are the inlet pipe 17 for the lighter phase and a discharge pipe 38 for the heavier phase. The pipe 38 terminates adjacent the bottom of the shell 34.

The arrangement of FIG. 6 is best suited where each of the two streams is liquid. It can however be employed when the stream of heavier phase is a slurry, in which case suction is applied to discharge pipe 38.

At the other end of the drum, the supply of the heavier phase and the discharge of the lighter phase may be as illustrated at the left-hand end of FIG. 1, or it may be similar to that provided at the heavier phase discharge end (FIG. 4, 5 or 6).

The contactors described above may be used for effecting mass-transfer operations between two counter-current streams, which may both be liquids (FIG. 6), or one of which is a liquid and the other of which includes solids in powder, crystalline or granular form. The mass-transfer operations include diffusional extraction, washing extraction, chemical extraction, leaching, and chemical reaction.

I claim:

1. A contactor for continuously contacting at least two streams, passing therethrough in substantially separate phases, said contactor comprising
   (a) a drum mounted for rotation about its axis;
   (b) means for causing rotation of said drum;
   (c) a plurality of axially spaced discs secured within said drum and dividing said drum interior into a series of compartments;
   (d) openings closely adjacent said drum and between the peripheries of said discs and said drum through which said separate phases can pass along said drum from compartment to compartment;
   (e) a plurality of receptacles within each of at least some of said compartments; located adjacent said drum; and arranged to rotate with said drum and to cause intermingling of said phases;
   (f) means for introducing said streams separately into said drum; and
   (g) means for discharging said streams separately from said drum.

2. A contactor according to claim 1, in which each said disc is near-circular and is peripherally secured to the drum.

3. A contactor according to claim 2, in which said openings are in the form of slots between the edges of each said disc and said drum wall.

4. A contactor according to claim 1, in which said receptacles extend between said discs of each of at least some of said compartments.

5. A contactor according to claim 4, in which said receptacles extend to the drum wall.

6. A contactor according to claim 5, in which said receptacles are secured to, and are largely carried by, said drum wall.

7. A contactor according to claim 1, in which the axis of said drum is inclined to the horizontal at an angle of less than 10°.

8. A contactor according to claim 1, for contacting a heavier slurry stream with a countercurrent lighter liquid stream, in which, at the end of said drum at which said slurry stream is discharged, there are concentrically arranged through a rotatable sealed joint an inlet for the liquid stream and a hopper arranged to receive slurry scooped up and discharged by the receptacles, the inlet for the liquid stream ending in an upwardly extending standpipe.

9. A contactor for continuously contacting a first stream and a second stream passing therethrough in substantially separate phases, said second stream including particulate solids, said contactor comprising:
  (a) a hollow cylindrical drum having an axis;
  (b) means for mounting said drum for rotation about its said axis with said axis lying substantially horizontal;
  (c) drive means for rotating said drum about said axis;
  (d) a plurality of radial discs which are axially spaced within said drum and the peripheries of which are secured to said drum, said discs dividing the interior of said drum into a series of compartments;
  (e) limited openings between the peripheries of said discs and said drum and closely adjacent said drum, said openings enabling said separate phases to pass along said drum from compartment to compartment;
  (f) a plurality of receptacles within each of at least some of said compartments, said receptacles being located closely adjacent said drum and arranged to rotate with said drum and to cause intermingling of said streams;
  (g) means for introducing said streams separately into said drum;
  (h) a rotatable joint centrally located in an end of said drum;
  (i) a discharge outlet through said joint;
  (j) means for conveying said solids of said second stream from said drum into and through said outlet; and
  (k) discharge means, separate from said discharge outlet, for discharging said first stream.

* * * * *